(12) United States Patent
Drumm

(10) Patent No.: US 7,817,324 B2
(45) Date of Patent: Oct. 19, 2010

(54) PROJECTOR

(75) Inventor: Jan Oliver Drumm, Regensburg (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 75 days.

(21) Appl. No.: 12/127,137

(22) Filed: May 27, 2008

(65) Prior Publication Data
US 2008/0297876 A1    Dec. 4, 2008

(30) Foreign Application Priority Data
May 31, 2007   (DE) .................. 10 2007 025 328

(51) Int. Cl.
G02F 1/01   (2006.01)
(52) U.S. Cl. .................................. 359/238
(58) Field of Classification Search ........ 359/238, 359/245, 254, 279, 276, 277, 278, 290, 291, 359/298; 353/28, 29, 30; 250/216, 208.1
See application file for complete search history.

(56) References Cited

U.S. PATENT DOCUMENTS

| 6,751,001 B1 * | 6/2004 | Tanner et al. ............ 359/238 |
| 7,561,133 B2 * | 7/2009 | Mestha et al. ............. 345/87 |
| 2003/0174019 A1 | 9/2003 | Suto et al. ................ 330/149 |
| 2005/0110954 A1 | 5/2005 | Kojima ..................... 353/31 |
| 2005/0111107 A1 | 5/2005 | Takeda et al. ............. 359/634 |

FOREIGN PATENT DOCUMENTS

| DE | 2657723 A1 | 6/1978 |
| GB | 2385227 | 8/2003 |
| JP | 2001269313 | 10/2001 |
| WO | 03067509 A1 | 8/2003 |
| WO | 2005121866 A1 | 12/2005 |
| WO | 2006/050263 | 5/2006 |
| WO | 2006050263 A2 | 5/2006 |

OTHER PUBLICATIONS

German Search Report; DE 102007025329.1; pp. 4.
English-language abstract for WO 2005/121866 A1 ; Dec. 22, 2005, p. 1.
English-language abstract for WO 03/067509 A1; Aug. 14, 2003, p. 1.
English-language machine translation of DE 2657723; Jun. 22, 1978, pp. 1-92.
German Search Report of DE 10 2007 025 328.3 mailed on Apr. 4, 2008; May 31, 2007;pp. 1-4.

* cited by examiner

Primary Examiner—Timothy J Thompson
Assistant Examiner—Tuyen Q Tra

(57) ABSTRACT

The projector has an intensity-modulable light source to emit a light beam onto a projection surface, as well as an optical switch connected after the light source for intensity modulation of the light beam emitted by the light source, and a control unit to control intensity modulation of the light source and the optical switch.

18 Claims, 5 Drawing Sheets

PROJECTOR

CROSS-REFERENCE TO RELATED APPLICATIONS

This application claims priority to German Patent Application Number 10 2007 025 328.3 filed on May 31, 2007, and which is incorporated herein by reference in its entirety.

TECHNICAL FIELD

The present inventions relates to projectors, such as laser projectors.

BACKGROUND

In many laser projectors laser beams of the primary colors RGB are deflected by a two-dimensional deflection mirror (so-called scanner mirror) onto a projection surface. By appropriate movement of the scanner mirror and a correspondingly coordinated time-intensity variation of the laser sources, an image is generated on a projection plane (so-called "flying spot method").

Diode lasers are used in miniaturized RGB laser projectors to generate the red and blue color fraction. Mostly infrared laser radiation is converted to green radiation by optically nonlinear methods to generate the green color fraction. Typical representatives are lasers of the DPSSL type (diode pumped solid state laser) or OPSL type (optically pumped semiconductor laser). Frequency conversion in the mentioned laser types is accomplished within the resonator or external to the resonator, depending on the version. Another possibility for generation of green laser radiation is the use of so-called upconversion fiber lasers. An energetically appropriate energy level that leads to generation of green laser radiation via stimulated emission is occupied in these lasers by means of 2-photon absorption of infrared laser radiation. Fiber lasers in the broadest sense can be classified among the DPSSL. In recent developments of fiber lasers, these can also be excited by means of blue laser diodes (400 nm-480 nm) (Sumita Company).

Based on the movement/time behavior, for example, a sine-like oscillation, of the scanner mirror in both axes, the equally large image spots are exposed for different lengths of time on the projection surface, depending on the position, viewed locally. For example, at a resolution of 640×480 pixels and scanning frequencies of fx=28 kHz in the x-direction and fy=1200 Hz in the y-direction, the exposure time of the image spots in the center of the image is about 17 ns. This is the duration of the shortest exposed image spot.

It follows from this that a time-intensity variation of the laser with defined bandwidth is necessary to achieve the required image resolution. For the example mentioned above, a necessary intensity variation bandwidth of at least 60 MHz is obtained. For higher resolutions or image repetition rates, a correspondingly higher intensity variation bandwidth is necessary.

Intensity variation bandwidths are possible with diode lasers (red and blue light) by variation of the operating current (subsequently called amplitude modulation) in the GHz range. For the green lasers, because of atomic lifetimes and optical travel times of the photons in the resonator, the amplitude modulation bandwidth is restricted. For miniaturized green OPSL, the amplitude modulation bandwidth lies in the range of the aforementioned 60 MHz. However, distinct signal distortions occur in the upper frequency range. The amplitude modulation bandwidth for miniaturized green DPSSL lies below 1 MHz. For these reasons, the green lasers are only operated comparatively rarely in amplitude modulation operation.

Green lasers are generally operated in continuous wave operation (continuously) and the intensity variation then occurs after the laser by means of an optically active switch (for example, an acousto-optic modulator (AOM) or an electro-optic modulator (EOM)). Such an arrangement has the drawback that the green laser is operated independently of image content and image spot position with maximum power absorption.

SUMMARY

A possibility for energy-saving operation of a light source with limited bandwidth, especially of a green laser, in a projector, can be provided with high image resolution and high image quality according to an embodiment, in which a projector may comprise an amplitude modulable laser for emission of a light beam onto a projection surface, an optical switch connected after the amplitude modulable laser for intensity of modulation of the light beam emitted by the light source, and a control unit to control an intensity modulation of the light source and the optical switch.

According to a further embodiment, the control unit can be operable to control the optical switch, so that the light beam passing through the optical switch is modulated with an image information and is operable to control the light source, so that the light beam emitted by it is modulated with a dimming function. According to a further embodiment, the dimming function may include a function of maximal energy density, referred to a brightest image spot. According to a further embodiment, the dimming function may include a function of a variably adjustable energy density distribution. According to a further embodiment, the dimming function may include a function of total image brightness. According to a further embodiment, the image information may include a gray level information per pixel. According to a further embodiment, the light source may be a bandwidth-restricted laser such as a green laser.

According to another embodiment, a method for projection of a light beam emitted by a light source onto a projection surface, may comprise the following steps: modulating the light source intensity of the light beam emitted by light source, and modulating the light beam by means of an optical switch connected after the light source.

According to a further embodiment, the step of modulating the light source intensity may include modulation with a dimming function and the step of modulating the light beam by means of the optical switch connected after the light source may include modulation with image information, especially a gray level range. According to a further embodiment, the step of modulating the light source intensity may include modulation with a function of maximal energy density, a function of variably adjustable energy density distribution, or a function of total image brightness. According to a further embodiment, the step of modulating the light source intensity may include modulation with a function of maximal energy density, a function of variably adjustable energy density distribution and a function of total image brightness.

BRIEF DESCRIPTION OF THE DRAWINGS

The invention is explained more thoroughly in schematic fashion in the following practical example. The same or equivalent features then have the same reference numbers.

DETAILED DESCRIPTION

Figure 1:
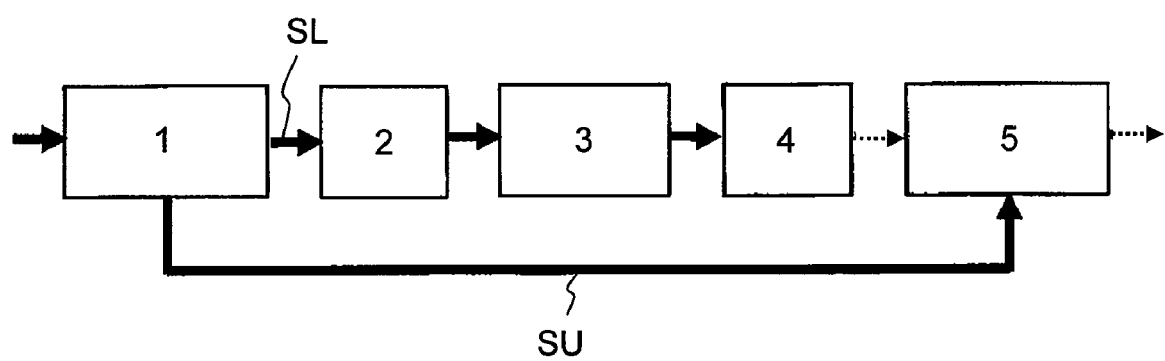
FIG. 1 shows a block diagram of a laser projector with amplitude-modulated laser.

According to an embodiment, projector may have an amplitude-modulable light source (for example, a laser) to emit a light beam onto a projection surface and at least one optical switch connected after the light source (for example, an EOM or AOM) for intensity modulation of the light beam emitted by the light source and a control unit to control intensity modulation of the light source and the optical switch (for example, video electronics, which converts an RGB input signal to appropriate control signals).

This embodiment permits the design of an energy-saving projector with high image resolution and high image quality even during the use of light sources with restricted intensity bandwidth, since full modulation of the light beam can be divided into modulation of the light source itself and modulation of the light beam by means of at least one optical switch. Because of this, modulation of the light source is particularly simplified. Overall, an energy saving is obtained, since the light source, especially a green laser, need no longer operate in continuous operation. In addition, the modulation bandwidth of the light source is now also sufficient for high image resolution and high image quality.

In other words, a combination of two mechanisms is present for time variation of the optical output signal of the light source. On the one hand, a first time-intensity variation occurs, in particular, by amplitude modulation of the light source itself in the range of the possible modulation bandwidth. On the other hand, at least one additional time-intensity variation occurs through the at least one downline optical switch.

According to an embodiment, a projector, in which the control unit is set up to control the optical switch, so that the light beam passed through the optical switch is modulated with image information and is set up to control the light source, so that the light beam emitted by it is modulated with a dimming function, can be particularly preferred. This variant permits, in particular, the intensity bandwidth of the light source to be sufficient for a generation of high-resolution images, since modulation of the image information generally requires a higher bandwidth than modulation of the dimming function.

According to an embodiment, a projector in which the dimming function includes a function of an equal, especially maximal energy density, referred to a brightest image spot, can be preferred. A brightness variation of an image projected onto the projection surface, caused by the illumination geometry, can be compensated on this account, especially to a level of maximum brightness.

In order to be able to adjust an arbitrary brightness distribution of the image (for example, to generate a specific optical effect, like edge darkening), according to an embodiment, the dimming function preferably may include a function of a variably adjustable energy density distribution.

In order to maximize brightness resolution, according to an embodiment, the dimming function preferably may include a function of total image brightness.

According to an embodiment, a projector in which the image information includes one gray level information per image spot, may also be preferred.

Better image quality and an energy saving can be achieved, according to an embodiment, by the above variants, especially during use of a bandwidth-restricted laser. The "global" image brightness information, which requires comparatively little bandwidth for its representation, can be imaged via the laser. The typically rapidly switching optical switch can then be fully used to achieve increased image quality. The energy saving can be obtained, among other things, by the fact that the laser is amplitude-modulated and not operated in continuous wave. Since the image brightness information is modulated via the laser, high energy savings can be achieved, in particular, in dark images.

The optical switch preferably includes an acousto-optic modulator or an electro-optic modulator, According to an embodiment.

According to another embodiment, a method for projection of a light beam emitted by a light source onto a projection surface may include the following steps: modulation of the light source to modulate an intensity of the light beam emitted by the light source, and modulation of the light beam by means of an optical switch connected after the light source.

According to yet another embodiment, a method, in which the step of modulation of the light source includes modulation with a dimming function and the step of modulation of the light beam by means of the optical switch connected after the light source includes modulation with image information, especially in one gray level range, may be preferred.

According to an embodiment, a method in which the step of modulation of the light source includes modulation with a function of maximum energy density, a function of variably adjustable energy density distribution and/or a function of total image brightness may also be preferred.

The light source advantageously may include a bandwidth-restricted laser, especially a green laser, and/or the optical switch includes an acousto-optic modulator or an electro-optic modulator, according to an embodiment.

According to an embodiment, a method in which the light beam emitted by the light source is modulated with a dimming function (with typically rather limited bandwidth) and the light beam passed through the optical switch is modulated with image information (with typically rather higher bandwidth) can be preferred.

FIG. 1 shows a block diagram of a projector PS1 with amplitude-modulated light source. The projector PS1 has an image processing control unit (video electronics) 1, which transforms a local intensity and color information of the image being depicted (for example, an RGB input signal) to a time-variable voltage signal. The voltage signal is generated in the form of a time-discrete vector present in digital form, which contains appropriate voltage information at each time step. This vector is transmitted over a laser control signal path SL to a digital/analog converter 2, which converts the vector to an analog voltage signal. The analog voltage signal is then transformed by a voltage-current converter as laser driver 3 into a current signal. The laser 4 converts the current signal into the desired optical laser intensity signal. A time-intensity variation of the light beam emitted by laser 4 occurs by modulation of its operating current ("amplitude modulation"). The light beam emitted by laser 4 is sent to a scanner mirror 5 and from it deflected onto a projection surface. Driving of a scanner mirror 5 connected after laser 4 occurs through appropriate voltage signals that are generated and optionally amplified by the video electronics 1 (mirror control signal path SU). During time agreement of deflection of the scanner mirror 5 with the time-intensity variation of the corresponding laser 4, the desired image forms on the projection plane. An image spot of a light beam emitted by laser 4 then describes a defined trajectory on the projection plane, for example, a Lissajous figure or a line scanning.

Figure 2:
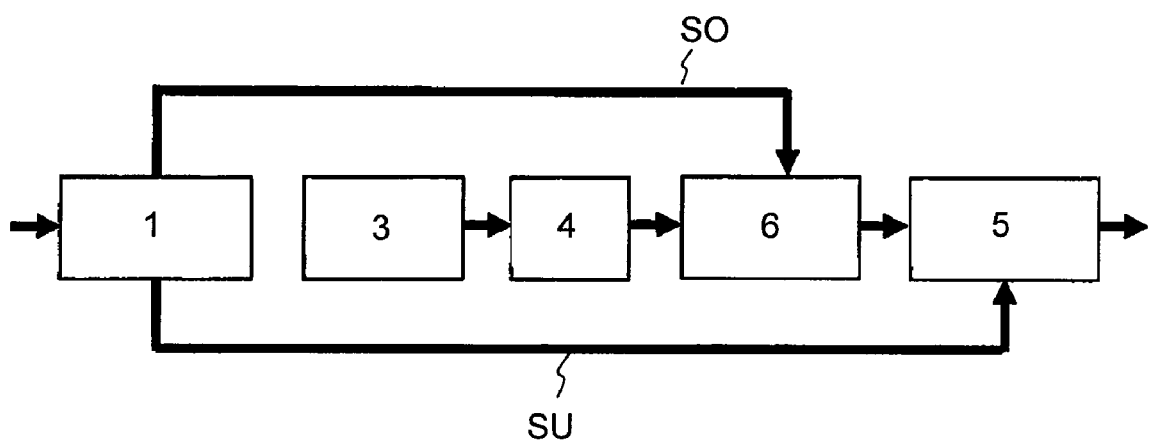
FIG. 2 shows a block diagram of a laser projector with optical switch.

FIG. 2 shows a block diagram of a projector PS2 with beam attenuation connected after the laser.

In the case of this downline intensity variation of the light beam through an appropriate optical switch 6, a time-discrete vector present in digital form is also generated in an image processing electronics (video electronics) 1, which contains appropriate voltage information for each time step. This voltage/time vector now controls an optical switch 6, which adjusts the intensity of a light beam passed through it for the considered time step (switch control signal path SO), namely passes it through unweakened or weakens it.

The intensity regulation in the considered time interval can then occur, for example, by a time-constant attenuation of laser intensity or by pulse width modulation (time switching of the transmission) of a digital switch 6. The optical switch 6 can include an acousto-optic modulator or an electro-optic modulator. The laser 4 is driven in continuous operation by laser driver 3.

Figure 3:
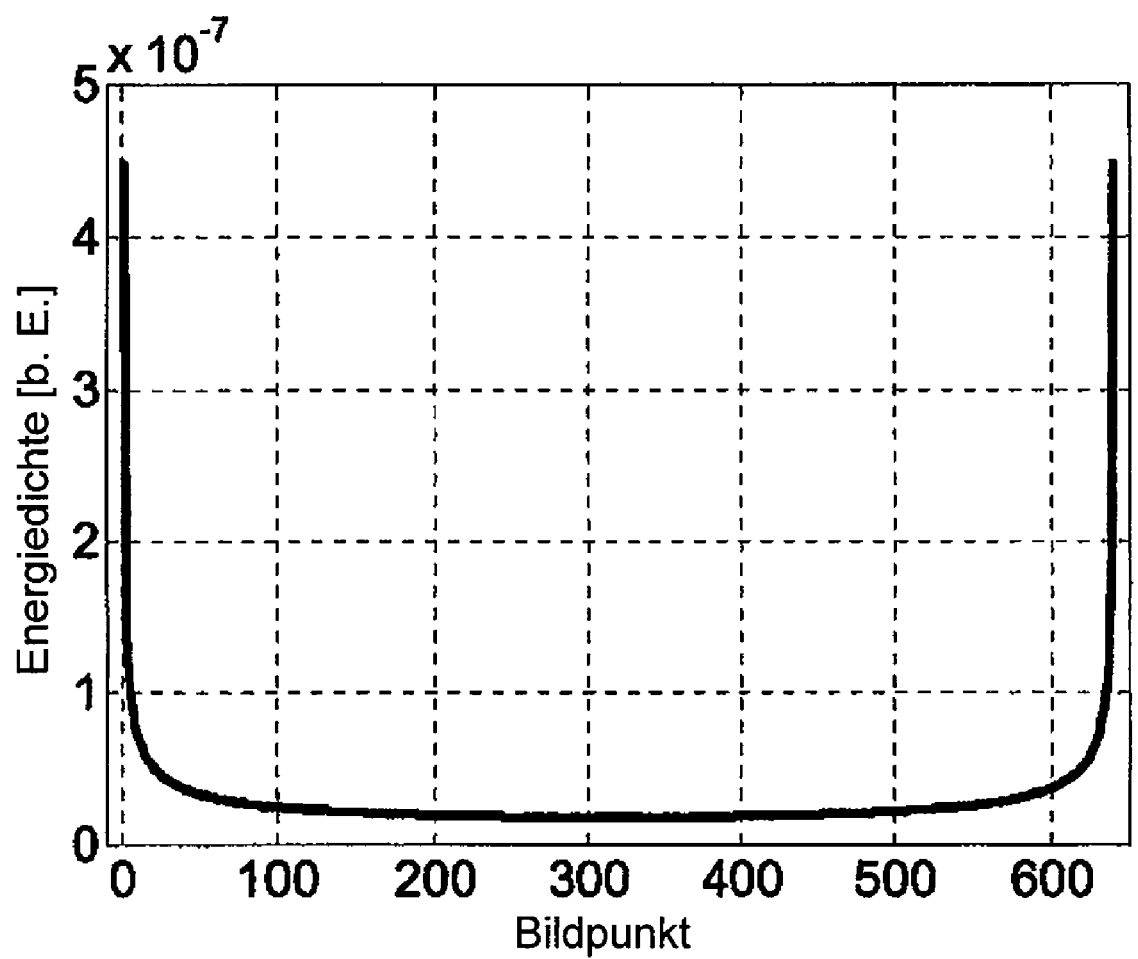
FIG. 3 shows a plot of a one-dimensional energy density in arbitrary units versus an image spot type.

FIG. 3 shows a plot of a one-dimensional energy density distribution in the x-direction in arbitrary units versus an image spot type on the example of a pure sinusoidal movement of a scanner mirror with a scanning frequency of fx=28 kHz and an image spot resolution of 640.

Based on the movement/time behavior of a sine-like oscillation of the scanner mirror in both axes, the equally large image spots imaged on the projection surface are illuminated for different periods of time, depending on the local position of the image spot. Sinusoidal movement of the mirror means oscillation of a light beam on the projection surface, in which the (imaginary) beam is emitted parallel to a perpendicular of the mirror surface with $x(t)=x0 \cdot \sine(2\pi \cdot fx \cdot t)$. Real mirror movements generally deviate from ideal sinusoidal movement. All possible movement forms of the scanner mirror are then usable, in principle, for example, as: rotating mirror, statically moving mirror, sinusoidally moving mirror and so forth.

An adjusted, especially constant energy density defined for all image spots can be generated by appropriate time-intensity variation of the light beam impinging on the projection surface. One possible method for appropriate time-intensity variation is initially explained on a one-dimensional example and then expanded to two dimensions.

Figure 4:
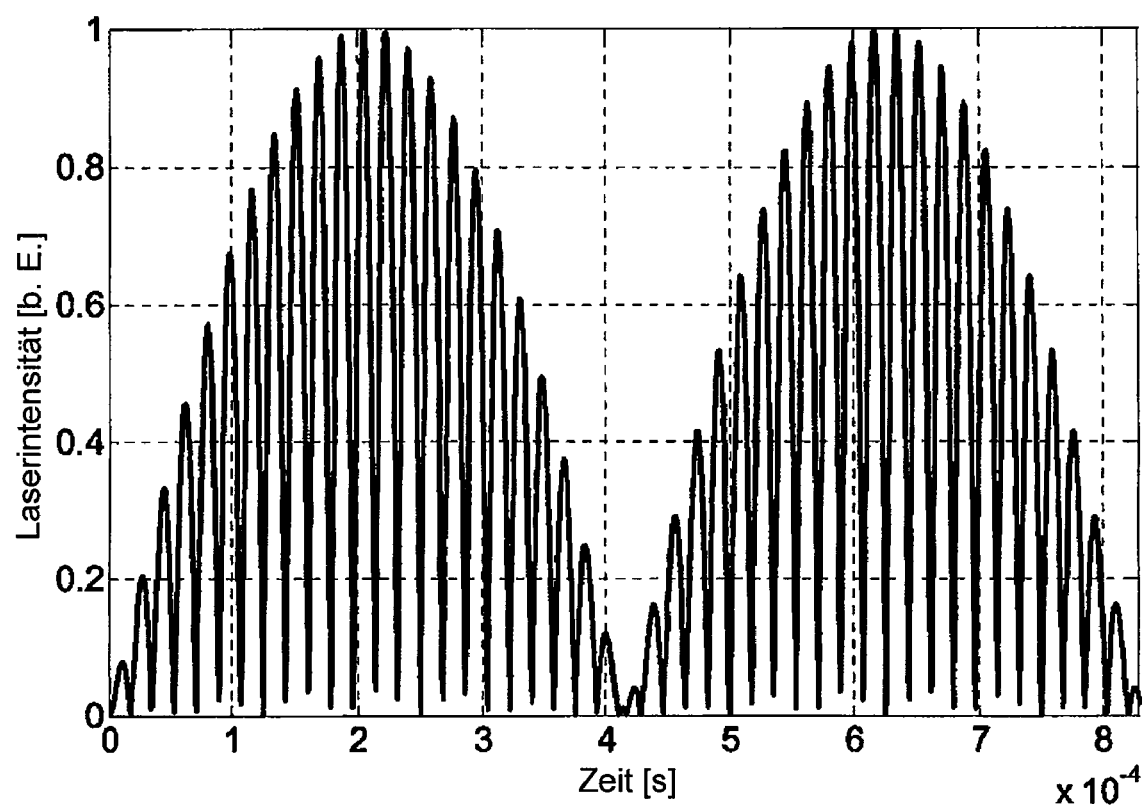
FIG. 4 shows a two-dimensional edge dimming function as a plot of laser intensity in arbitrary units versus time in s.

FIG. 4 shows a two-dimensional edge dimming function as a plot of laser intensity in arbitrary units versus time t in s on the example of pure sinusoidal movements of a scanner mirror with scanning frequencies of fx=28 KHz in the x-direction and fy=1200 Hz in the y-direction.

In order to obtain constant energy density at the location of the image spot, the laser intensity of the light beam illuminating the image spot is preferably varied in time proportion to the derivative of the movement/time function of the scanner mirror. This time-intensity variation is briefly referred to below as "edge dimming".

For two-dimensional movements of the scanner mirror, a total edge dimming is obtained from overlapping (here: multiplication) of the horizontal and vertical edge dimming function. The intensity of the laser beam is not reduced/dimmed in the image center, since the image spot there is present with the lower energy density.

The energy emitted by the laser corresponds to the surface beneath the dimming function and is therefore much smaller than during continuous operation.

By overlapping (here: multiplication) of additional dimming functions, an arbitrary two-dimensional energy density distribution can be adjusted, for example, with energy density dropping toward the image edge to produce a specific optical effect, or a constant intensity reduction for optical standby operation and so forth.

The image content being displayed is generated according to the mirror position over time by gray level variation with time of the energy density distribution.

The explained image generation is applicable to all light beams of the projector.

To explain the image formation process, the functional relations are discussed more precisely below. In particular, a total intensity variation $M_{tot}$ is introduced as an example. $M_{tot}$ describes the total intensity variation of the light beam and is a variation of the maximum continuous laser power P0, the scanning frequency fx in the x-direction, the scanning frequency in the y-direction and the time t. In particular, $M_{tot}$ can be composed of:

the maximum continuous laser power P0, a maximum horizontal edge dimming function Kdim_x=to generate a constant energy density in the x-direction, which is dependent on fx and t, i.e., kdim_x=Kdim_x (fx, t);

a maximum horizontal edge dimming function Kdim_y=to generate a constant energy density in the y-direction, which is dependent on fy and t, i.e., Kdim_y=Kdim_y (fx, t); (Kdim_x·Kdim_y) then represents a maximum energy density, referred to the brightest pixel of an image being displayed and can be derived, in particular, from the geometric edge conditions of the projector; optionally an additional dimming function Dim_zus to generate an arbitrary energy density distribution with Dim_zus=Dim_zus (fx, fy, t);

an image content information Gs corresponding to a gray level gradation with reference to an energy density distribution with Gs=Gs (fx, fy, t).

The function Gs can additionally be divided into the fractions Gs_max and Gs_rel. The function Gs_max is a function of the image repetition rate t_bwh and contains the maximum gray level of a (partial) image, which is constructed with the image repetition rate t_bwh. In other words, Gs_max represents the total image brightness, referred to the brightest image spot. The time unit t_bwh can be the total image repetition rate, for example, 50 Hz, or, especially in scanning laser projectors, the partial image buildup rate, which corresponds to double the frequency fy.

The function Gs_rel is a function of time t and time unit t_bwh. The function Gs_rel describes the relative gray level variation in time, referred to the maximum gray level. Gs_rel represents the image information digitally or in gray levels, for example, from 0 to 255. By adjustment of Gs_max, Gs_rel can be configured with maximum resolution. If, for example, the maximum brightness value of an image has the value 122 (from a range [0 . . . 255]), Gs_max can represent the maximum ratio to the theoretically largest brightness step, for example, 122/255. Gs_max can then assume the values [0 . . . 255], which increases the resolution.

The total intensity variation can therefore be represented as $M_{tot}$=P0·Kdim_x·Kdim_y[·Dim_zus]·Gs_max·Gs_rel.

Dimming functions Kdim_x, Kdim_y and optionally Dim_ zus, together with the maximum half-tone function Gs_max, set a "global" brightness distribution of the projection surface, which requires a comparatively limited bandwidth for its representation, the relative maximum gray level function Gs_rel sets the image content information, i.e., the image spot-related "logic" information to be displayed (for example, text, images).

Figure 5:
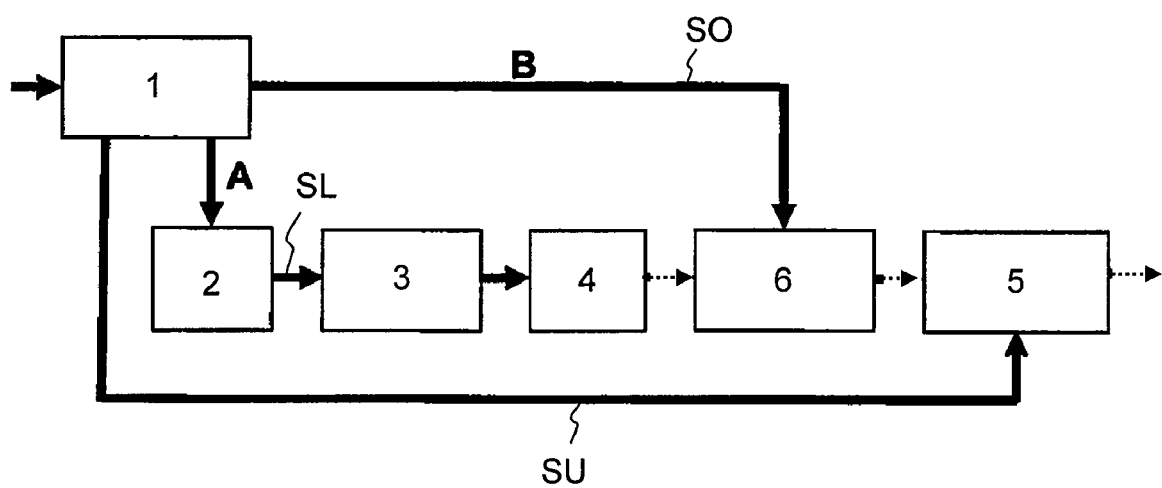
FIG. 5 shows a block diagram of a projector according to an embodiment.

FIG. 5 shows a block diagram of a projector PN according to an embodiment. As in FIG. 1, the projector PN has an image processing control unit (video electronics) 1, which converts the local intensity and color information of the image being depicted (RGB input signal) to a corresponding time-variable voltage signal, which is converted by means of a digital/analog converter 2 to an analog voltage signal, which is again transformed to a current signal by means of a laser driver 3. The laser 4 converts this current signal into the desired optical laser intensity signal, a time-intensity variation of the light beam occurring by modulating of its operating current ("amplitude modulation") (signal path SL). The laser beam is then passed to a scanner mirror 5, whose drive occurs via the signal path SU by appropriate voltage signals, which are generated and optionally amplified by video electronics 1.

However, instead of sending the light beam emitted by laser 4 directly (or through beam-forming optics, like lenses, collimators, etc.) to the scanner mirror 5, as shown in FIG. 1, an optical switch 6 is connected between laser 4 and scanner mirror 5 for downline intensity variation of the light beam in analog similar fashion to the variant according to FIG. 2. The control electronics/video electronics 1 also controls the optical switch 6 via signal path SO, which adjusts the intensity of the light beam passed through it for the considered time step, namely passes it through unweakened or weakens it, for example, by time-constant weakening of the laser intensity or by pulse width modulation (time switching of the transmission).

Laser 4 can be a green laser of the type DPSSL or OPSL. The green laser 4 can then be integrated in an RGB laser module or incorporated discretely in the projector. The block diagram is shown as an example for a laser 4, but can be expanded to any number of lasers.

Both first time-intensity variation of the green laser 4 by amplitude modulation of laser 4 in the range of a defined modulation bandwidth and a second time-intensity variation by the optical switch 6 now therefore occur in projector PN. The control electronics 1 for this purpose calculates two appropriate voltage/time vectors A and B from the incoming imagine information signal, which are sent via signal path SL to the digital/analog converter 2 or via signal path SO to the optical switch 6. This splitting occurs, so that the total intensity variation function $M_{tot}$ introduced above is split into two partial functions A and B, corresponding to $$M_{tot} = A \cdot B$$

with

A=$M_{tot}$=P0·Kdim_x·Kdim_y[·Dim_zus]·Gs_max,
B=Gs_rel

While A describes a "global" brightness distribution of the projector surface, which can be displayed also by laser 4 with lower intensity variation width, as of the DPSSL or OPSL type, the image content information, i.e., the image spot-related "logic" information to be displayed (for example, text, images) is set by the optical switch.

In contrast to purely laser amplitude-modulated variant according to FIG. 1, high resolution images can be projected with high image quality. In contrast to the optically switched variant according to FIG. 2, an energy-saving projector can be constructed, since the bandwidth-restricted laser is not operated in continuous operation, but its output power is modulated.

Splitting of the time-intensity variation into two execution mechanisms can be applied without restriction of generality to the red and blue laser diodes as well. This is especially true when the system of laser driver plus laser is bandwidth-restricted. The driver electronics for the red and blue lasers can be laid out technically, so that the desired image resolution (=modulation bandwidth) can be achieved, but a system of bandwidth-restricted driver plus laser plus split time-intensity variation can turn out to be more cost-effective.

LIST OF REFERENCE NUMBERS

1 Control unit
2 Digital/analog converter
3 Laser driver
4 Laser
5 Scanner mirror
Optical switch
A Intensity control function
B Intensity control function
PN Projector
PS1 Projector
PS2 Projector
SL Signal path to laser
SO Signal path to optical switch
SU Signal path to scanner mirror

What is claimed is:

1. A projector comprising:
an intensity modulable light source for emission of a light beam onto a projection surface,
an optical switch connected after the intensity modulable light source for intensity modulation of the light beam emitted by the light source, and
a control unit to control an intensity modulation of the light source and of the optical switch, wherein
the control unit is setup to control the optical switch, so that the light beam passed through the optical switch is modulated with an image information and wherein the control unit is setup to control the light source, so that the light beam emitted by the light source is modulated with a dimming function.

2. The projector according to claim 1, wherein the dimming function includes a function of maximal energy density, referred to a brightest image spot.

3. The projector according to claim 1, wherein the dimming function includes a function of a variably adjustable energy density distribution.

4. The projector according to claim 1, wherein the dimming function includes a function of total image brightness.

5. The projector according to claim 1, wherein the image information includes a gray level information per pixel.

6. The projector according to claim 1, wherein the light source is a bandwidth-restricted laser.

7. The projector according to claim 6, wherein the light source is a green laser.

8. A method for projection of a light beam emitted by a light source onto a projection surface, the method comprising the following steps:
modulating the light source intensity of the light beam emitted by light source, and
modulating the light beam by means of an optical switch connected after the light source,
wherein the step of modulating the light source intensity includes modulation with a dimming function and the step of modulating the light beam by means of the optical switch connected after the light source includes modulation with image information.

9. The method according to claim 8, wherein said image information comprises a gray level range.

10. The method according to claim 8, wherein the step of modulating the light source intensity includes modulation with a function of maximal energy density, a function of variably adjustable energy density distribution, or a function of total image brightness.

11. The method according to claim 8, wherein the step of modulating the light source intensity includes modulation with a function of maximal energy density, a function of variably adjustable energy density distribution and a function of total image brightness.

12. A projector comprising:
    an intensity modulable light source,
    an optical switch coupled with an output of the intensity modulable light source for modulation of the light beam intensity, and
    a control unit to control an intensity modulation of the light source and of the optical switch,
    wherein the control unit is operable to control the optical switch such that the light beam passing through the optical switch is modulated with an image information and is operable to control the light source such that the light beam is modulated with a dimming function.

13. The projector according to claim 12, wherein the dimming function includes a function of maximal energy density referred to a brightest image spot.

14. The projector according to claim 12, wherein the dimming function includes a function of a variably adjustable energy density distribution.

15. The projector according to claim 12, wherein the dimming function includes a function of total image brightness.

16. The projector according to claim 12, wherein the image information includes a gray level information per pixel.

17. The projector according to claim 12, wherein the light source is a bandwidth-restricted laser.

18. The projector according to claim 17, wherein the light source is a green laser.

* * * * *